Patented Nov. 3, 1936

2,059,815

UNITED STATES PATENT OFFICE 2,059,815

OIL LACQUER

Walther Schrauth, Berlin-Dahlem, Germany, assignor, by mesne assignments, to "Unichem" Chemikalien Handels A.-G., Zurich, Switzerland, a corporation of Switzerland No Drawing. Application July 1, 1932, Serial No. 620,533. In Germany July 4, 1931

5 Claims. (Cl. 134—26)

It has been found that in the preparation of lacquers, varnishes or spatulating masses higher molecular alcohols which have of recent times become easily obtainable and which correspond to the saponificacious carbonic acids, can be used to great advantage either as such or mixed with one another. The alcohols which may be used are some of them thin liquids, as, for instance, those corresponding to the cocoa-nut fat acids or naphthenic acids; some of them thick liquids, such, for instance, as oleic alcohol or those alcohols which can be obtained from the reduction of resinic acids; some of them firm or of the consistency of paste, such as cetyl alcohol, myristic alcohol or lauric alcohol. By combining these alcohols with one another or with other basic substances used in the manufacture of lacquers it is possible to produce primary materials of any consistency desired, wherewith one can make the above mentioned materials. It has further been found that the alcohols here in question can also be used in the form of their esterification products,—whether with lower molecular fatty acids as, for instance, cetyl acetate or with higher molecular saponificacious carbonic acids as, for instance, resinic acid lauryl ester, or the ester which is obtained from the esterification of higher molecular alcohols with linseed oil, sunflower oil and similar substances.

The products for which an application for a patent is herewith made have a fatty or a wax-like character and neutral reaction and they possess the exceptional characteristic that in combination with the usual basic materials they furnish excellent lacquers and spatulating masses from which they do not exude after drying; they are further capable of absorbing large quantities of filling material as the high molecular atoms or alternately, their esters, owing to their viscosity and their dispersing power are able to keep the suspended colouring particles (pigments) in a state of fine distribution and to prevent their deposition. The new lacquer compositions are easy to apply, do not tend to a gelatinous solidification in the presence of copal gums or similar substances, and give a tough resisting lacquer layer. The products described further have good solvent powers for siccates, for instance, pyro-naphtenous cobalt, so that they are well suited to the preparation of siccative extracts.

Example I.—An asphalt lacquer which will dry on is prepared by diluting 300 parts of asphalt, 80 parts of oleic alcohol, 100 parts of wood oil and 8 parts of pyro-linseed oil cobalt with the amount of varnish benzine or similar substance which is necessary to produce a lacquer applicable with a brush.

Example II.—To prepare a resin oil lacquer, 210 parts of resin (colophonium) are heated up to 300° with 35 parts of an alcohol mixture obtained from the reduction of palm-kernel fatty acid and 140 parts of wood oil, and then mixed with 4 parts of pyro-naphtenous cobalt and the necessary diluting liquid.

Example III.—250 parts of linseed oil are mixed with 50 parts of cetyl acetate, 30 parts of oleic alcohol and the desired pigment, and reduced to the consistency necessary for application with a brush. The lacquer coating so obtainable remains elastic and does not scale off.

Example IV.—600 parts of dammar resin are melted down with 50 parts of myristic alcohol and 650 parts of linseed oil and diluted with a mixture containing alcylated benzenes or with a similar substance.

Example V.—If 500 parts of linseed oil are heated up to 300–320° for some time with 200 parts of an alcohol mixture obtained by the reduction of naphtenic acids or cocoa-nut oil acid, a partial esterification takes place besides the formation of oil. If 100 parts of copal and 15 parts of lead-manganese oleate are then added to the resulting reaction product, an excellent polishing varnish is obtained.

I claim:—

1. An oil lacquer comprising an oil of the group consisting of linseed oil and wood oil in a major proportion, a siccative and the ester of a resinic acid and lauryl alcohol.

2. An oil lacquer comprising an oil of the group consisting of linseed oil and wood oil in a major proportion combined with an alcohol corresponding in molecular structure to the soap forming acids.

3. An oil lacquer comprising an oil of the group consisting of linseed oil and wood oil in a major proportion combined with an ester of an alcohol corresponding in molecular structure to a soap forming acid with acetic acid.

4. An oil lacquer comprising an oil of the group consisting of linseed oil and wood oil in a major proportion combined with an ester of an alcohol corresponding in molecular structure to a soap forming acid with resinic acid.

5. An oil lacquer comprising an oil of the group consisting of linseed oil and wood oil in a major proportion combined with material of the group consisting of the alcohols corresponding in molecular structure to the soap forming acids and the esters of said alcohols with acids of the group consisting of acetic acid and resinic acid.

WALTHER SCHRAUTH.